(12) United States Patent
Kamieniecki

(10) Patent No.: US 7,162,733 B2
(45) Date of Patent: Jan. 9, 2007

(54) METHOD AND APPARATUS FOR AUTOMATIC SET-UP OF ELECTRONIC DEVICES

(75) Inventor: John Kamieniecki, Lafayette Hill, PA (US)

(73) Assignee: General Instrument Corporation, Horsham, PA (US)

( * ) Notice: Subject to any disclaimer, the term of this patent is extended or adjusted under 35 U.S.C. 154(b) by 674 days.

(21) Appl. No.: 09/968,824

(22) Filed: Oct. 2, 2001

(65) Prior Publication Data

US 2003/0066080 A1 Apr. 3, 2003

(51) Int. Cl.
*H04N 7/173* (2006.01)

(52) U.S. Cl. .................. 725/133; 725/80; 725/141; 725/153; 348/460; 348/734

(58) Field of Classification Search .......... 340/825.69, 340/825.72, 825.22; 348/734, 460, 553; 725/80–81, 132–134, 140–142, 152–153; 398/106, 112

See application file for complete search history.

(56) References Cited

U.S. PATENT DOCUMENTS

| | | | | |
|---|---|---|---|---|
| 5,488,409 A | * | 1/1996 | Yuen et al. | 725/41 |
| 5,600,711 A | * | 2/1997 | Yuen | 379/102.03 |
| 5,677,895 A | * | 10/1997 | Mankovitz | 368/10 |
| RE35,954 E | * | 11/1998 | Levine | 380/242 |
| 5,988,078 A | * | 11/1999 | Levine | 345/721 |
| 6,057,874 A | * | 5/2000 | Michaud | 348/6 |
| 6,124,804 A | * | 9/2000 | Kitao et al. | 340/825.69 |
| 6,204,796 B1 | * | 3/2001 | Chan et al. | 341/176 |
| 6,433,831 B1 | * | 8/2002 | Dinwiddie et al. | 348/553 |
| 6,577,231 B1 | * | 6/2003 | Litwin et al. | 340/310.01 |

* cited by examiner

*Primary Examiner*—Ngoc Vu
(74) *Attorney, Agent, or Firm*—Benjamin D. Driscoll

(57) ABSTRACT

A method and apparatus to automatically set-up an electronic device having multiple user-controllable functionalities is provided by an arrangement that provides an interactive menu to a user. The user interacts with the menu to select and set a functionality to a desired setting. The automatic set-up arrangement receives a set-up command corresponding to the menu choice and transmits the set-up command to the electronic device in the form of an IR beam. The IR beam containing the set-up command is used to set the user-controllable functionality of the electronic device to the selected setting.

26 Claims, 9 Drawing Sheets

METHOD AND APPARATUS FOR AUTOMATIC SET-UP OF ELECTRONIC DEVICES

BACKGROUND OF THE INVENTION

This invention relates to electronic devices, and more particularly, to a method and apparatus for automatic set-up of electronic devices.

Electronic devices, including consumer electronic equipment such as video cassette recorders ("VCRs"), tape players, compact disc ("CD") players, Digital Versatile Disc ("DVD") players, cable television (referred to commonly as community access television or "CATV") set-top terminals, satellite receivers, home theater systems, stereo systems and televisions, require some degree of programming to invoke desired features and functions or set operating parameters. Typically, user-defined settings such as local time and user-preferences (for example language, stored channels or stations, picture and audio settings) must be set-up, configured or initialized by the user (all such terms being referred to collectively in the description that follows as "set-up"). Such user-controlled functions and preferences are typically set-up by entering a command sequence (i.e., a string of commands) by pushing buttons on a remote control. The remote control transmits a radio-frequency ("RF"), or more typically an infrared ("IR") signal (for example a pulse coded modulated IR carrier) to the electronic device to set the function to the desired setting. With some electronic devices, buttons on the electronic device itself are pushed as a replacement or supplement to the remote control to perform the set-up function.

As electronic devices have evolved to include increasingly sophisticated and complex features, the operator interface required to set-up the device can be very complicated. User's manuals and documentation describing the operation of all such features have become voluminous and increasingly difficult to comprehend in many instances. In addition, the command sequence to set-up and control these features is often lengthy, and the user must locate each button on the remote control (which may include a large number of individual buttons) to effectively set-up the electronic device. If the buttons are not actuated within a predetermined time period, the remote control typically "times out" and the user may be required to reenter the command sequence from the beginning. In addition, with some remote control arrangements, the command sequence must be reentered if the user actuates an incorrect button.

In the case of televisions (and devices such as VCRs, DVDs, home theater components and set-top terminals that are typically connected to televisions), programming is often facilitated using a graphical user interface ("GUI") provided by an on-screen display ("OSD") on the television. In other cases, the GUI is provided by a display incorporated within the remote control itself. The GUI provides a menu of choices and/or data fields that are presented to user on the television or remote control display screen. The user presses buttons on the remote control to navigate through the menu to enter the required data and effect the desired settings. Sometimes the GUI guides the user through multiple "screens" that may be arranged in a hierarchical manner in order to set-up the multitude of available user-controlled features and functions that the electronic device provides.

While remote control set-up works well in many cases, the convenience of such arrangements is often reduced by having to locate a specific remote control to match a specific electronic device. Most all electronic devices are designed to work with a particular remote control that uses a matching communication protocol. Difficulties may be created for the user in coordinating the set-ups of multiple devices using different remote controls. For example, in order for a user to use a VCR to record a program broadcast on a satellite network, the satellite receiver, VCR and television must be coordinated properly. If any of these devices are not set-up correctly, the attempted recording may be unsuccessful. In addition, electronic devices—even those sold under the same brand—often use very different set-up and programming schemes. That is, the command sequence (and corresponding set of button pushes on the remote control) to set the clock on a television, for example, may require steps or data entries that differ, in number and sequence, from those used to set-up a VCR.

In addition to the physical differences in buttons and push sequences, remote controls typically use set-up interfaces that vary considerably in "look and feel." Thus, the steps used to move through a menu, enter data such as dates, times, and channels, enable a feature, or correct a mistaken button push (to cite just a few examples) are not consistent with every remote control. Such variability makes it difficult for the user to set-up all of the user's electronic devices (without consulting an operating manual for each of the devices), and users often find setting up their electronic devices to be a demanding, exacting, and generally frustrating experience.

With many electronic devices, an interruption in power necessitates that features be set-up again once power is restored. For example, the time, channel surfing order, and preferred video and audio settings on a television may be lost during a power outage or when a user disconnects power to move the television from one location to another. When power is restored, the television displays the incorrect time and may default to factory-settings for channels and settings. With electronic devices such as VCRs, the display often shows a flashing "12:00" that remains flashing until the user resets the clock. Users have been known to live with the flashing "12:00" rather than endure the inconvenience associated with resetting the electronic device to the correct time. Power outages are not uncommon and may occur many times over the course of year in a typical household which leads to the time consuming and frustrating task of setting up each of the affected electronic devices.

SUMMARY OF THE INVENTION

A method and apparatus to automatically set-up an electronic device having multiple user-controllable functionalities is provided by an arrangement that provides an interactive menu to a user. The user interacts with the menu to select and set a functionality to a desired setting. The automatic set-up arrangement receives a set-up command corresponding to the menu choice and transmits the set-up command to the electronic device in a wireless signal such as an RF transmission or IR beam. The wireless signal containing the set-up command is used to set the user-controllable functionality of the electronic device to the selected setting.

In an embodiment of the invention, the automatic set-up arrangement includes set-top terminal capability. A remote control that operates the set-top terminal and automatic set-up arrangement is provided. A television is operably coupled to the automatic set-up arrangement so that it may receive television programming and other transmissions, via the set-top terminal, from a network such as a CATV communication system. The television also displays the menu (in the form of a GUI) to facilitate the user selection of settings that is provided by the automatic set-up arrangement.

After the user identifies an electronic device to the automatic set-up arrangement (for example by entering brand and/or model information or by selecting a particular electronic device from a menu of devices) the GUI displays one or more sets of user-controllable functions to the user. Each set of user-controllable functions matches a specific electronic device, and multiple sets of user-controllable functions may be used to facilitate set-up of the user's entire collection of electronic devices.

A user selects a desired setting for a selected functionality from a menu pertaining to the identified electronic device. Set-up commands relating to the selected settings are obtained from a set-up command database. Data allowing the pertinent menu to be displayed by the GUI and the set-up commands may be stored locally within the automatic set-up arrangement or be obtained from a network source, such as a controller or server at the headend of the CATV system. The obtained set-up commands are transmitted in an IR beam to the electronic device to set-up the device according to the user's selections.

The user works through each electronic device in a collection performing a set-up on each, repeating the process as necessary to change a set-up of an electronic device or to initialize new equipment added to the collection. Settings may be restored by user command, or automatically upon restoration of power after a power outage. A time stamp is obtained from a network source so that clock settings in all affected electronic devices may be restored accurately.

In another embodiment of the invention, an automatic set-up arrangement receives an IR signal representing a command (or multiple IR signals representing a command sequence) from a native remote control that is employed by a user while setting-up an electronic device in a conventional manner. The command or command sequence is sent to a memory where it is stored. Commands and command sequences for a user's entire collection of electronic device may also be stored. When a triggering event such as a power outage and restoration is detected, a command or command sequence is transmitted in an IR beam to the electronic device to automatically restore its settings.

In other embodiments of the invention, the electronic device is identified by a process where the automatic set-up arrangement performs the identification based on the receipt of an example of command sequences that are entered by the user on the native remote control. A guided set-up is also provided when the arrangement detects that the user requires assistance or when an new electronic device (i.e, one not previously known to the automatic set-up arrangement) is detected. Remote configuration and troubleshooting of electronic device set-ups, both with and without the use of customer service personnel, and an embodiment of the invention where set-ups are shared among a group of users are further disclosed.

Advantageously, the inventive arrangement provides a consistent user interface that is independent of the variability in set-up command sequences. The user also gains the benefit of having a single arrangement that can set-up a variety of electronic devices from different manufacturers without having to know how to program the device, or needing to consult the user's manual. The automatic set-up arrangement of the present invention further provides a convenient means to coordinate the set-up of multiple electronics devices. In addition, a single command (or substantially reduced command string lengths compared with those provided by native remote controls) may be advantageously employed by the user to restore preferred settings or reset a clock after a device is moved, for example. Alternatively, the user may configure the inventive arrangement to reset settings and set clocks to the correct time automatically whenever power is interrupted and subsequently restored.

DETAILED DESCRIPTION

Figure 1:
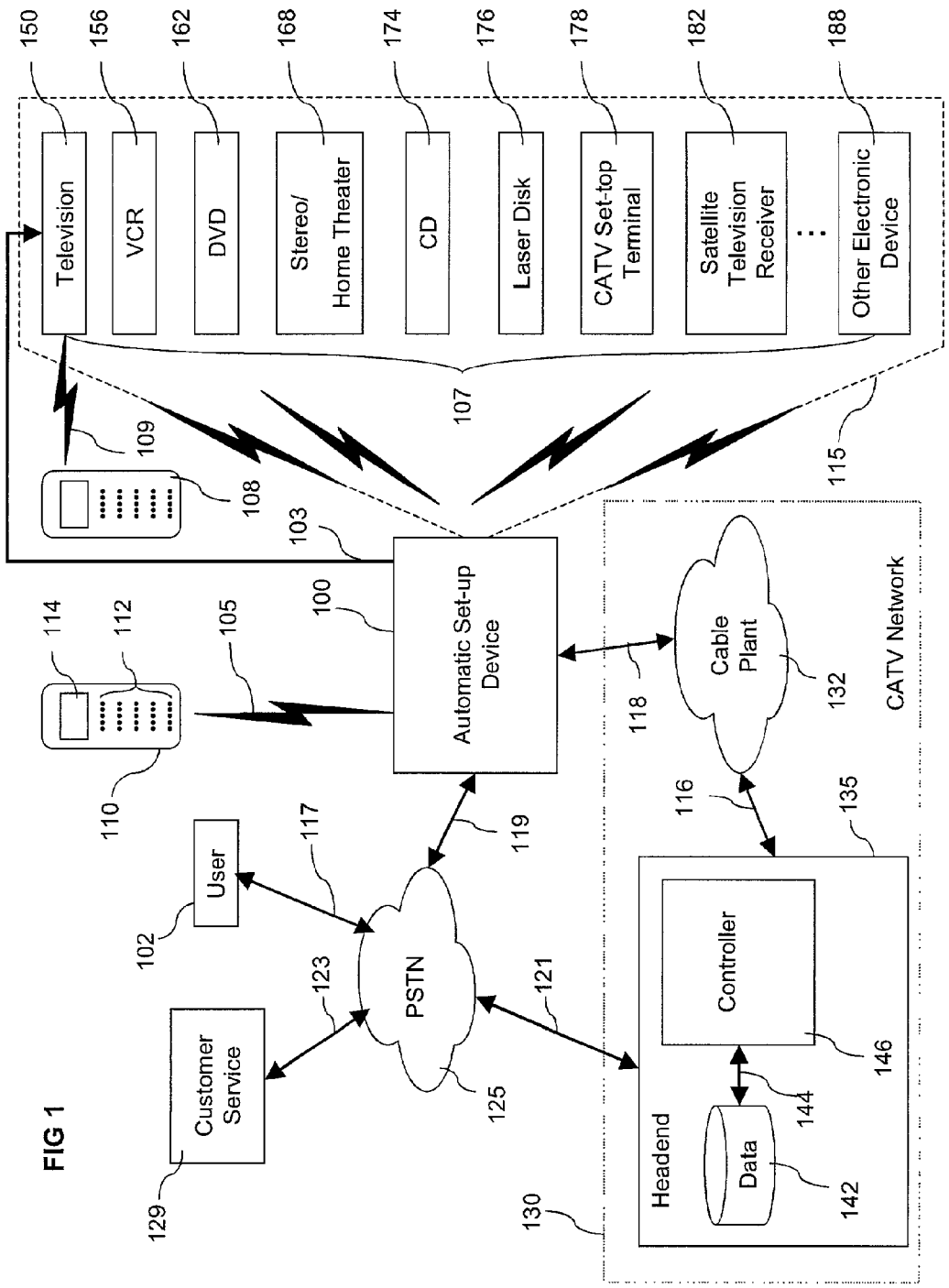
FIG. 1 is a simplified functional block diagram of an arrangement facilitating practice of the invention, including an automatic set-up device.

Referring now to FIG. 1, there is shown a simplified block diagram of an arrangement, in accordance with the invention, including an automatic set-up device 100. Also depicted in FIG. 1 is a collection of electronic devices (collectively designated by reference numeral 107), a remote control 110, network 130, and customer service station 129. Automatic set-up device 100 is arranged to receive wireless communications from remote control 110, for example via an RF signal or more preferably, an IR beam represented by reference numeral 105 in FIG. 1. Automatic set-up device 100 is further arranged to broadcast a command signal (or sets of command signals) to electronic devices 107 as represented by the area in FIG. 1 enclosed by the line designated 115. Such broadcast may be implemented as an RF signal, however, an IR beam may be preferred in most applications of the invention.

Automatic set-up device 100 is operably coupled to network 130. In the illustrative embodiment depicted in FIG. 1, network 130 is a CATV system including a transmission media (such as a cable plant 132) and headend 135. Cable plant 132 may comprise a co-axial network, a hybrid fiber-coax network, or a wireless cable network using microwave transmission apparatus. Network 130 and cable plant 132 may be arranged for either unilateral or bilateral communications—the principles of the present invention are equally applicable to both cases.

Headend 135 is coupled to automatic set-up device 100 through the cable plant 132, as indicated by lines 116 and 118. Headend 135 is typically arranged to receive television, video, audio and data content from remote service providers (not shown in FIG. 1) and transmits such received signals to set-top terminals distributed along points in the network 130. As described in more detail in the text accompanying FIGS. 2 and 3 below, automatic set-up device 100 is combined with set-top terminal functionality that enables the arrangement to receive and use signals received from network 130.

Headend 135 comprises a database 142 which is coupled via bus 144 to a controller 146. Controller 146 may be arranged from conventional servers and similar devices. Database 142 is an electronic hard-disk drive (or an array of such devices) or other suitable conventional memory. Database 142 is arranged to store set-up commands that may be downloaded to automatic set-up device 100 under control of controller 146.

Another network may be optionally utilized in some applications of the invention. As shown in FIG. 1, a public switched telephone network ("PSTN") 125 is operably coupled between automatic set-up device 100 and headend 135, via lines 119 and 121, respectively. PSTN 125 is representative of a communication network that is typically used to carry both voice and data signals. Accordingly, PSTN may allow a user 102 to communicate, via voice telephone call with a customer service location 129, over lines 117 and 123 as shown in FIG. 1. The customer service location 129 may, in some applications of the invention, be co-located with elements forming CATV network 130 and operated by the same service entity providing CATV service to user 102.

FIG. 1 shows PSTN 125 as coupling automatic set-up device 100 to headend 135 via line 119 and 121. Such connection is an optional configuration that allows requests and other communications to be uploaded from automatic set-up device 100 to the controller 146 in headend 135. PSTN 125 may advantageously employed, for example, if network 130 and cable plant 132 are not arranged for bi-directional transmission, or if upstream bandwidth is limited. Alternatively, PSTN 125 may be used to supplement or back-up available upstream transmission bandwidth.

Remote control 110 is arranged in a conventional manner to control automatic set-up device 100, and the functions included therein. Remote control may include a set of buttons 112 and a display 114 (such as liquid crystal display, or "LCD") to facilitate user interaction with the automatic set-up device 100. It is noted that while remote control 110 may be advantageously used to facilitate practice of the invention, it may also be desirable, in some applications, to provide a user interface directly on automatic set-up device 100. For example, a set of buttons and display may be placed on a panel (not shown) that is conveniently located on automatic set-up device 100 to facilitate user interaction with automatic set-up device 100.

A variety of remote electronic devices are depicted in the illustrative embodiment of FIG. 1, and may include the typical components of a home entertainment system that may be manufactured by different companies. These are shown in FIG. 1 as television 150, VCR 156, DVD player 162, stereo/home theater controller 168, CD player 174, laser disc player 176, CATV set-top terminal (i.e., "cable box") 178, and satellite television receiver 182. Other electronic devices and home entertainment components may also be advantageously used with the invention. Such devices are collectively depicted in FIG. 1 by the functional block identified by reference numeral 188. Electronic devices 107 may be operably coupled via hardwire connections or a communications bus (not shown). Electronic devices, as described in the background section, are generally controllable by a matching native remote control. For the sake of clarity in FIG. 1, a single native remote control 108 is depicted for controlling television 150 via an IR control beam 109, however native remote control 108 represents the plurality of native remote controls that are used with the collection of electronic devices identified by reference numeral 107.

Television 150 is coupled to automatic set-up device 100 with connection 103 so that television 150 may receive programming from CATV network 130. In addition, television 150 conveniently provides a means for an OSD that facilitates user interaction with the inventive arrangement using a GUI.

Figure 2:
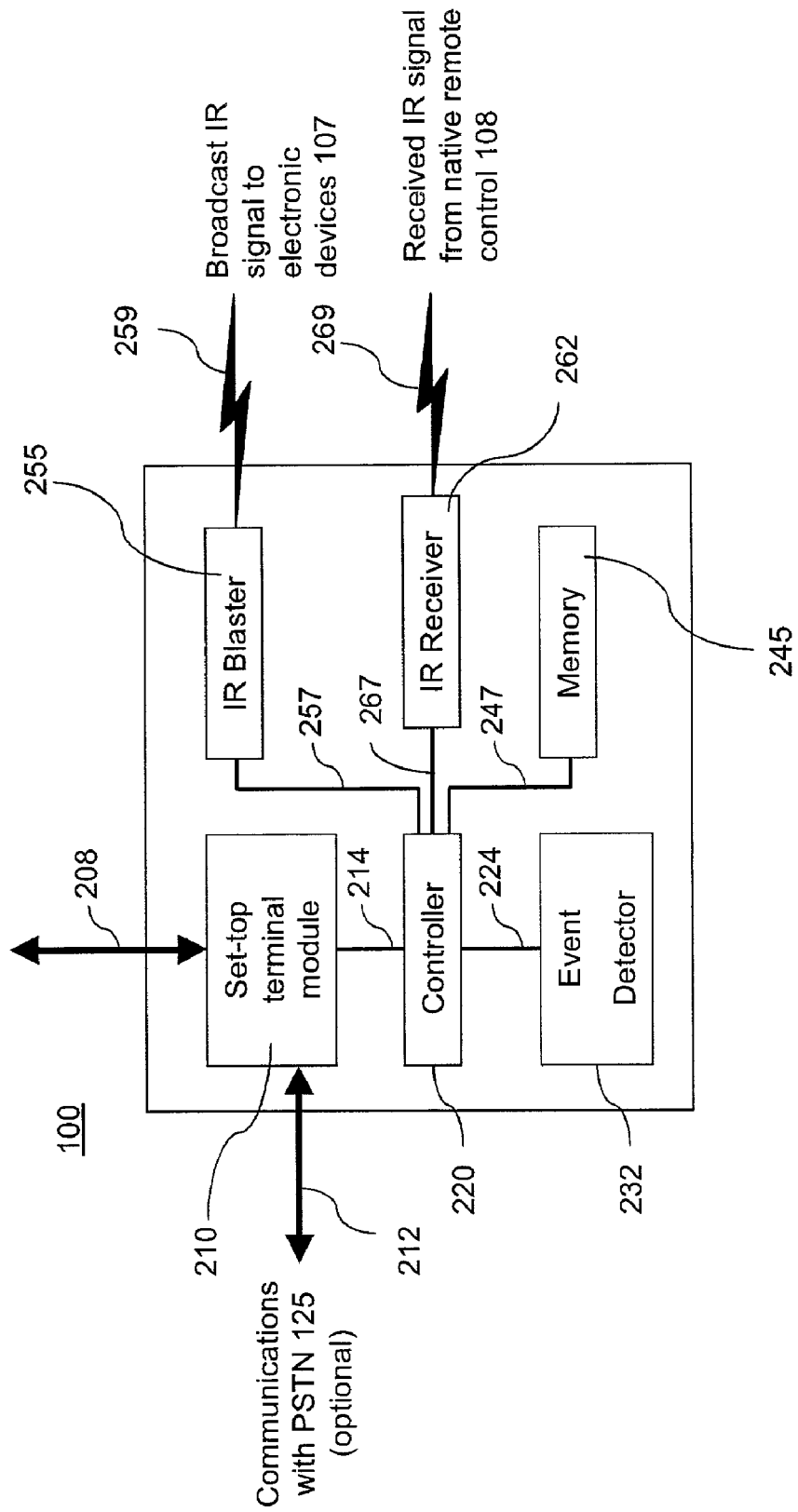
FIG. 2 is a simplified functional block diagram depicting details of the automatic set-up device of the invention, including a set-top terminal module, IR blaster, IR receiver, controller, event detector, and memory.

Turning now to FIG. 2, there is shown a simplified functional block diagram depicting details of the automatic set-up device 100, including an optionally utilized set-top terminal module 210, IR blaster 255, IR receiver 262, controller 220, memory 245, and event detector 232. Automatic set-up device 100 is arranged to broadcast IR signals to the electronic devices 107 (FIG. 1) and receive IR signals from native remote controllers 108 (FIG. 1), as indicated by reference numerals 259 and 269, respectively. Communications with network 130 (FIG. 1) may be optionally utilized, in either unilateral or bilateral communications mode, depending upon the requirement of the application, as shown by line 208. Communications with PSTN 125 may also be optionally used, as shown by line 212 representing an appropriate communications interface in FIG. 2. Set-top terminal Module 210, and communication interfaces 208 and 212 are optionally utilized when automatic set-up device 100 is configured to download data from database 142 (FIG. 1).

Figure 3:
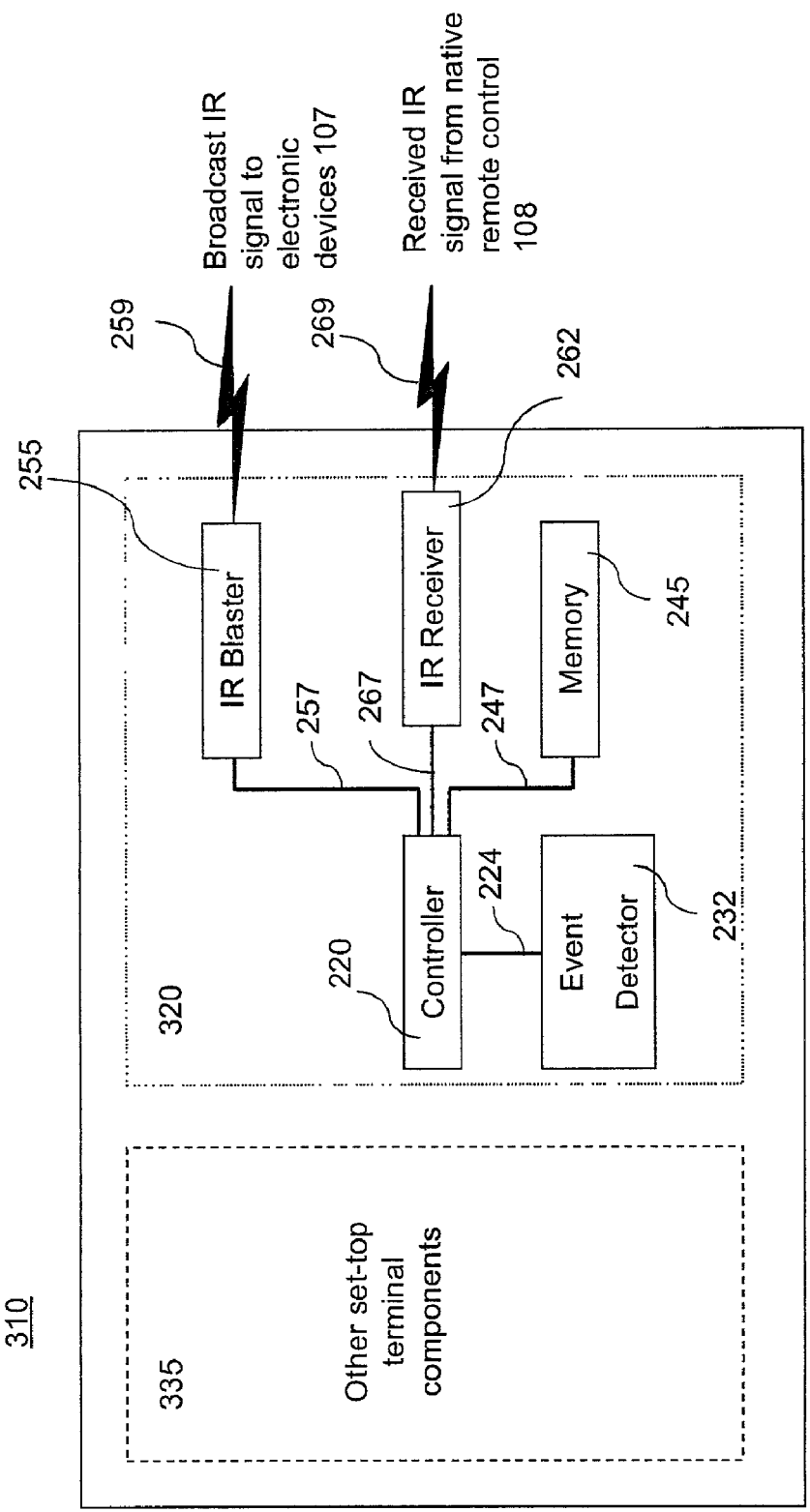
FIG. 3 is a simplified functional block diagram showing a set-top terminal having an automatic set-up module, in accordance with the invention.

In many applications of the invention, the automatic set-up device 100 may be conveniently packaged or integrated with a set-top terminal. As shown in FIG. 3, certain elements used in automatic set-up device 100 may be included as additional functional blocks in a standard set-top terminal 310, such as a Motorola DCT5000 interactive digital set-top terminal. The components employed to implement set-top terminal functions are collectively shown and identified in FIG. 3 by reference numeral 335. The automatic set-up device of the invention may be implemented as a module 320 within the set-top terminal 310, as shown in FIG. 3. Alternatively, the functions provided by some elements may be implemented by using existing set-top terminal components (that may be suitably modified, if required). For example, the IR receiver, controller and memory functions described herein may be advantageously implemented, in some applications, by employing appropriate components that are in place to facilitate typical set-top terminal features and functions. Users may interact with the set-top terminal 310 using an appropriately configured remote control, or via direct access to a user interface (e.g., buttons and a display) provided on the set-top terminal itself.

In other applications of the invention, sufficient data may be stored in memory 245 to facilitate the use of automatic set-up device 100 in a stand alone mode where no connections to external data sources or networks are required. Alternatively, additional data may be accessed by the automatic set-up device 100 operated in a stand alone mode by using removable storage media such as memory cards and cartridges, floppy diskettes, or CD-ROMs.

Returning back to FIG. 2, IR receiver 262 is operably coupled to controller 220 with bus 267. IR receiver 262 is arranged to detect and receive IR signals 269 transmitted by native remote controls 108. In particular, IR receiver 262 is specifically enabled to receive a wide variety of coded IR transmissions that may be sent using any number of protocols. That is, IR receiver 262 is intended to detect and receive many IR transmission parameters including carrier frequency, bit modulation scheme, transmission start and stop methods, number of data bits and types, and so on, in order to understand the command or other information that is carried by the IR signal. Thus, for example, automatic set-up device 100, using IR receiver 262 and controller 220, may receive and understand a button push (or sequence of pushes) indicating "channel up", "power", "scroll up", "scroll down" alphanumeric entries, or the like, made by the user using any of the native remote controls 108.

IR blaster 255 is selected to broadcast an IR signal 259 to electronic devices 107 under operative control of controller 220 via bus 257. The IR signal comprises set-up commands that are derived from commands stored in database 142 (FIG. 1) or memory 245, or codes transmitted by native remote control 108 that are detected and stored. IR blaster 255 is further selected to broadcast using a variety of transmission protocols so that the electronic devices 107, which may be made by different manufacturers, may receive and understand the set-up commands contained in the broadcast IR signal 259. IR blaster 255 may also be arranged, in some applications of the invention, to simultaneously broadcast multiple sets of set-up commands in a multiplexed IR signal to effectuate set-up of multiple electronic devices 107 at the same time.

Event detector 232 is operably coupled to controller 220 with bus 224. Event detector functions 232 to detect one or more events, such as power outage and restoration events, that are used to trigger the automatic restoration of settings in electronic devices. Event detector 232 may be selected from discrete functional elements, including appropriate circuits, or may be realized in firmware (not shown), or as software resident, for example, in memory 245 or database 142 (FIG. 1) that controls the operation of controller 220 to provide for event detector functionality.

In the case of power outage and restoration detection, event detector 232 may be arranged to monitor the voltage applied to the AC power line coming into the automatic set-up device 100. If the voltage drops below a threshold, or if the power is lost altogether and then is subsequently restored, event detector provides an appropriate notification to controller 220. In such an arrangement, the automatic set-up device 100 is placed on the same electrical circuit as electronic devices 107 so that a power loss at the automatic set-up device 100 is indicative of a power loss at the electrical devices 107. Other arrangements may also be used to detect a power loss event, for example, the automatic set-up device 100 may be equipped with a power supply capable of powering a number of electronic devices 107. In this case, power loss at the automatic set-up device 100 unambiguously indicates a corresponding loss at the electronics devices. Alternatively, the electronic devices may be actively monitored where, for example, an IR command is periodically sent to a device and a corresponding response is detected. Failure to receive the expected response may be indicative of a power loss at the device. Such alternatives may be advantageously employed in instances where AC power detection at the automatic set-up device is impractical as an event trigger (for example, in large collections of electronic devices requiring the use of multiple AC circuits). Active monitoring can thus detect a partial power loss condition that may occur, for example, when only a single circuit breaker is tripped but power is not generally out.

Memory 245 is operably coupled to controller 220 using bus 247, as shown in FIG. 1. Memory 245 may be realized in random access memory or as readable and writeable storage, such as a hard-disk drive. In most applications of the invention, it is desirable that memory 245 be configured in a non-volatile arrangement where the stored contents are kept intact irrespective of whether power is supplied to the memory. Memory 245 may be used to store set-up commands, preferred electronic device settings and other data (such as data allowing pertinent menus to be displayed to the user), alone or in combination with database 142.

Figure 4:
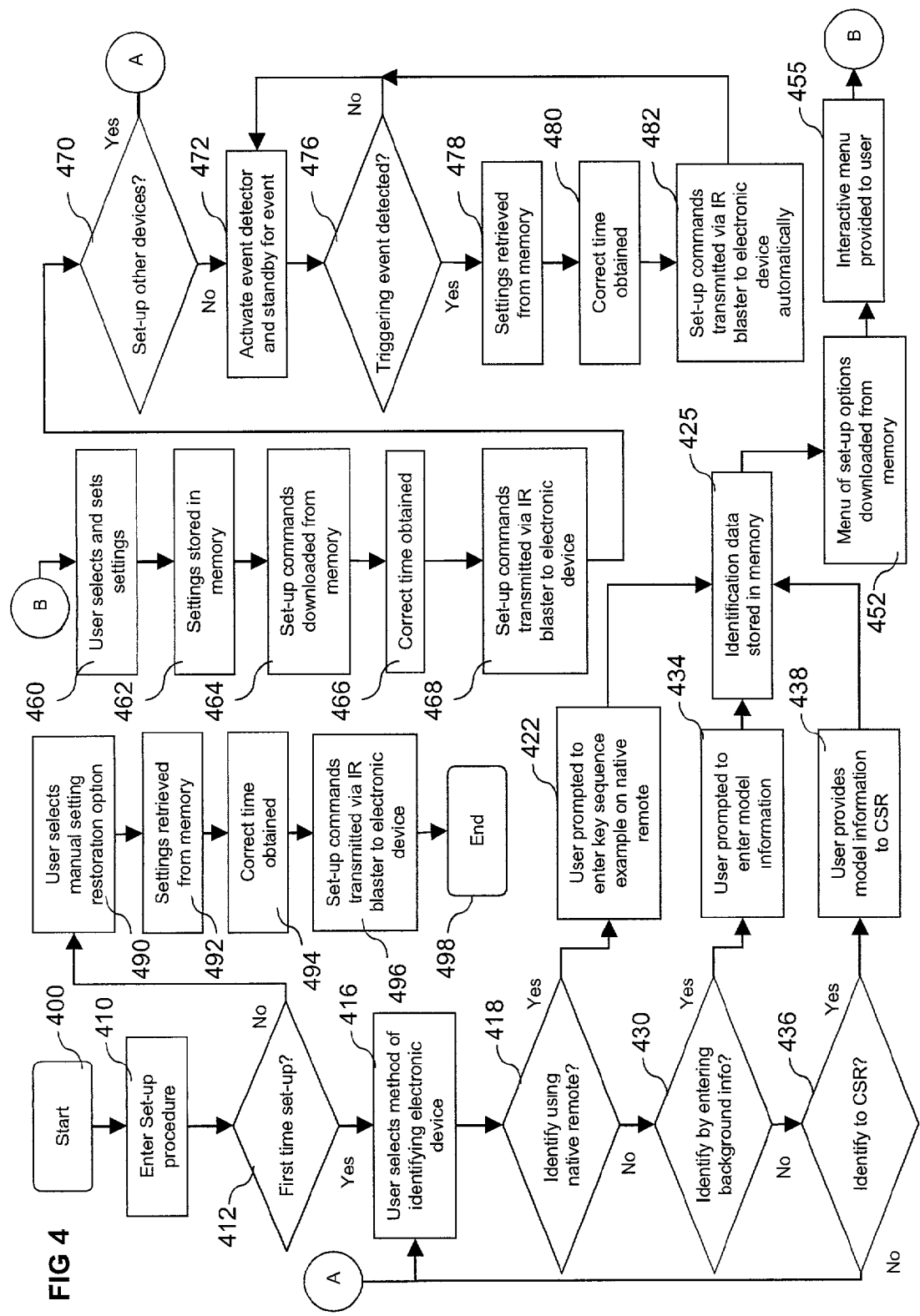
FIG. 4 is a flowchart depicting an illustrative method of operating an automatic set-up device, in accordance with the invention.

FIG. 4 is a flowchart depicting an illustrative method of operating the automatic set-up device 100. The method starts at block 400. A user interacts with remote control 110 (FIG. 1) to enter a set-up procedure, as shown in block 410. In many applications, a GUI is desirable to facilitate the set-up procedure, which may be displayed on the display screen 114 of remote control 110 or as an OSD on the coupled television 150 (FIG. 1). A group of hierarchically arranged menus are employed in this step for displaying options that the user may select to navigate through the set-up procedure.

At decision block 412, the user indicates whether a certain electronic device is being set-up for the first time, or whether the user wishes to restore setting on a device that was previously set-up (and for which settings were stored). If a first time set-up, the process moves to block 416, where the user selects a particular method to identify the electronic device to the automatic set-up device 100. As shown in FIG. 4, three different methods may be used: identification through use of the native remote control; identification through entry of certain background information pertaining to the device; or, identification through interaction with a customer service representative at customer service location 129 (FIG. 1).

At decision block 418, if the user elects to identify the electronic device using the native remote control 108 (FIG. 1), then at the step depicted by block 422, the GUI prompts the user to enter an exemplary key or button-push sequence from the native remote control 108. An IR signal representative of the exemplary sequence is received by IR receiver 269 (FIG. 2). Characteristics of the received IR signal are passed to the controller 220 (FIG. 2) or uploaded to controller 146 (FIG. 1) where they are compared to a stored library of characteristics contained in the respective memory 245 (FIG. 1) or database 142 (FIG. 2).

The stored characteristics have a corresponding electronic device so that a match made between the characteristics of the received IR signal and those contained in the library allows the identification to be made. A dedicated comparator, or functionally equivalent arrangement of controller 220 and firm or software, may be used in the case of local processing. Alternatively, either alone or in combination with the matching function performed by the automatic set-up device 100, controller 146 may be similarly configured (or a dedicated comparator utilized) to supplement or replace the local matching function with remote processing.

Identifying characteristics for most major electronic devices are available from manufacturers and a large number may be readily stored in memory 245 or database 142. In some applications of the invention where the matching is performed by a local comparator (or functionally equivalent processor) at the automatic set-up device 100, then updated identifying characteristics and corresponding devices may be downloaded, on a regular basis or as needed, from the CATV network 130. Such updating may be desirable, for example, as electronic equipment typically evolves quickly in terms of new features and functions, and new equipment is introduced to the market on a regular basis. However, as noted above, it may be desirable to operate automatic set-up device 100 in a stand alone mode in some applications. Updates in this case, if needed or desired, may be accomplished for example, using removable storage media such as magnetic diskettes, or other nonvolatile removable memory including memory cards, sticks, and cartridges. In other applications, updated data may be obtained using another network connection, for example a connection to a wide area network such as the Internet that is provided to the user's personal computer.

The second method of identifying an electronic device is depicted at block 430 of FIG. 4, where the user, by interacting with remote control 110, manually enters information into fields supplied by the GUI, or selects the electronic device from a menu, as shown in block 434. The interface may be arranged to accept identification data using manufacturer and model numbers, for example, or in the case of certain electronic devices, using a code that uniquely identifies the device.

The remaining method of identifying an electronic device to the automatic set-up device 100 of the present invention comprises a telephone call between the user 102 and customer service location 129 over PSTN 125 and lines 123 and 117 (FIG. 1). In this case, the user may describe identifying data to a customer service representative ("CSR"), as shown in block 438. The CSR identifies the device from the description and sends the pertinent identification data over the PSTN 125, or other network such as a local area network (not shown in FIG. 1), to automatic set-up device 100 or headend 135 for further processing.

Data pertaining to the identified electronic device may be stored, either locally in memory 245, or remotely in database 142 as indicated in block 425 of FIG. 4. The inventive arrangement may use the stored data to manage the set-up interface with the user so that stored set-ups for each electronic device in the user's collection may be reviewed periodically. Such review capabilities advantageously allows the user to manage the large constellation of features and functions provided by the collection.

In block 452, a menu (or collection of menus) having pertinence to the identified electronic device is retrieved from memory 245 or downloaded from database 142 and displayed to the user through the GUI, as indicated in block 455. That is, a specific menu that is feature-appropriate to the identified electronic device is obtained by automatic set-up device 100, in accordance with the invention.

The method moves next to block 460, where using remote control 110 (FIG. 1), the user works through each displayed menu in turn, entering data or making selections as appropriate, until the settings for the identified electronic device are selected accordingly. In block 462, the settings are stored, either locally in memory 245 or uploaded to database 142 at the headend 135 of CATV network 130 (FIG. 1).

A set-up command, or set-up command sequence corresponding to the selected settings are retrieved from memory 245 or downloaded from database 142, as indicated in block 464. As with the library of identifying characteristics, the set-up commands that are used with specific electronic devices are available from most major manufacturers. In applications where automatic set-up device 100 operates as a stand alone device, updates to the stored set-up commands may be installed locally through removable media, or through an alternative to CATV network 130, such as an Internet connection.

As indicated in block 466, the time is obtained so that electronic devices having a clock function can be set-up with the correct time. A time stamp may obtained from a network source, such as headend 135, or in applications where automatic set-up device 100 is operated in a stand alone mode, accurate time may kept locally or obtained from an alternative source, for example via the AC power line, or satellite source. A time stamp may also be obtained from on-air signals such as those from Public Broadcasting Service stations (i.e., "PBS" stations), where local time information is inserted within the vertical blanking interval of the analog transmission stream.

Moving to block 468, the method continues where the set-up commands are transmitted by IR blaster 255 (FIG. 2) to set-up the electronic device 107 identified in the earlier steps (blocks 418 to 425 and accompanying text). It is noted that blocks 452 through 468 in FIG. 4 and the accompanying text depict and describe an aspect of the invention referred to below as a "guided set-up." The set-up is guided as the inventive arrangement advantageously facilitates the configuration of a user's electronic devices through the interactive menus, stored settings, and downloaded commands.

If the user has other electronic devices to set-up, then the process repeats at block 416. Otherwise, event detector 232 (FIG. 2) is activated so that the automatic set-up device 100 is in a standby mode and readied to restore settings in the case of a power outage event, as depicted in block 472.

If a triggering event is detected by event detector 232, such as a power outage and restoration, then settings appropriate to an electronic device or a plurality of such devices are retrieved from memory 245 (FIG. 2) or from database 142 (FIG. 1). While a power outage and restoration is one example of a event that may trigger a set-up restoration in accordance with the invention, other events may also be a trigger. For example, a low voltage, or "brown out" condition may be sufficient to cause programmed set-ups to be lost or corrupted in an electronic device. In addition, events such as the switch to and from standard to daylight savings time (i.e., a seasonal time change) may prompt a set-up command or command sequence to be broadcast automatically. The event detector 232 would be arranged accordingly.

Continuing with the method, after settings are retrieved from memory, as depicted in block 480, a correct time is obtained in a similar manner as described above. Set-up commands are obtained as described in the text accompanying block 464 of FIG. 4. The set-up command or command sequence is broadcast to restore settings with those stored in accordance with user selection, as shown in block 482. After restoration, control returns to block 472, where automatic set-up device 100 is placed back in standby mode to await another triggering event.

In some circumstances, it may be desirable for the user to restore stored set-up settings associated with one or more electronic device 107 (FIG. 1) where such restoration is independent of the above-described triggering events, and thus is not automatic. For example, as depicted in blocks 490 through 498 in FIG. 4, a user may choose to manually trigger a setting restoration of one or more selected electronic devices 107. This aspect of the inventive method begins at block 490 where the user picks a manual restoration option from a menu and designates a particular electronic device or a number of devices, for which settings are to be restored. The settings that were previously stored (using the method depicted in blocks 416 to 462 and described in the accompanying text) are retrieved from memory and the correct time is obtained, as shown in blocks 492 and 494, respectively. Block 496 indicates that a set-up command or command sequence that correspond to the retrieved settings are also retrieved from memory 245 (FIG. 2) or downloaded from database 142 (FIG. 1), and then broadcast by the IR blaster 255 (FIG. 2) to restore the settings in electronic devices 107. The method ends at block 498, as shown in FIG. 4.

Figure 5:
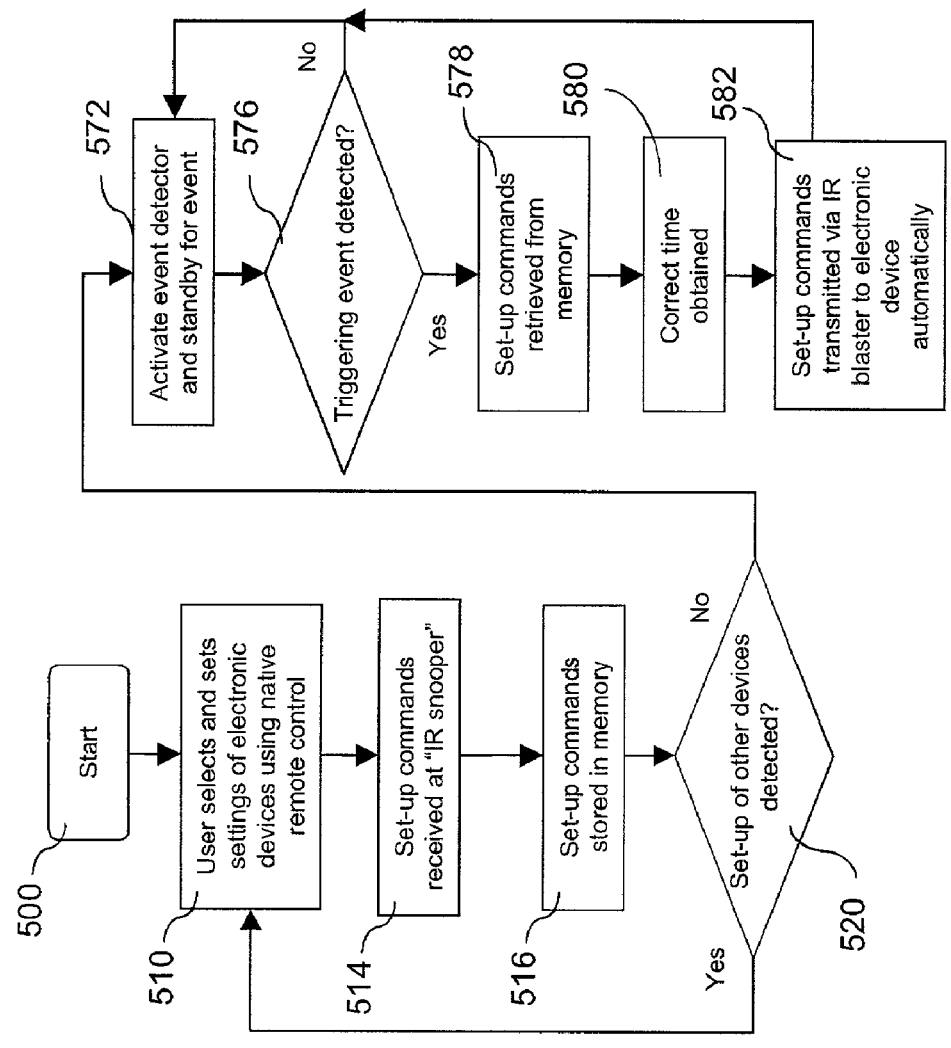
FIG. 5 is a flowchart depicting another illustrative method of operating an automatic set-up device, in accordance with the invention.

FIG. 5 is a flowchart depicting another illustrative method of operating the automatic set-up device 100, in accordance with the invention. In this illustrative method, IR receiver 262 performs as an "IR snooper" where it receives IR signals transmitted by a native remote controllers 108 (FIG. 1) when a user set-ups an electronic device in a conventional manner. IR receiver 262 thus operates transparently in the background, and its receipt of the IR signals from native remote controllers 108 does not effect the normal set-up or use of the electronic device.

The method starts at block 500. At block 510, as shown in FIG. 5, the user selects and sets-up the desired settings of features and functions using a native remote control in a conventional manner. At block 514, the IR snooper (e.g., IR receiver 262) receives the set-up commands from the native remote control that are coded in an IR beam.

The received commands are stored locally in memory 245, uploaded to database 142, or a combination of local and remote storage may be used, as depicted in block 516. At decision block 520, if other electronic device set-ups are detected, then the process described with blocks 510 to 516 repeats, and set-up commands for the other electronic device are also stored in memory.

The method continues at blocks 572 to 582 where, upon the detection of a triggering event, set-up commands are automatically broadcast via an IR beam to the electronic devices to restore settings, in accordance with the invention. The method of blocks 572 to 582 is similar to the method depicted in blocks 472 to 482 of FIG. 4 and described in the accompanying text.

Figure 6:
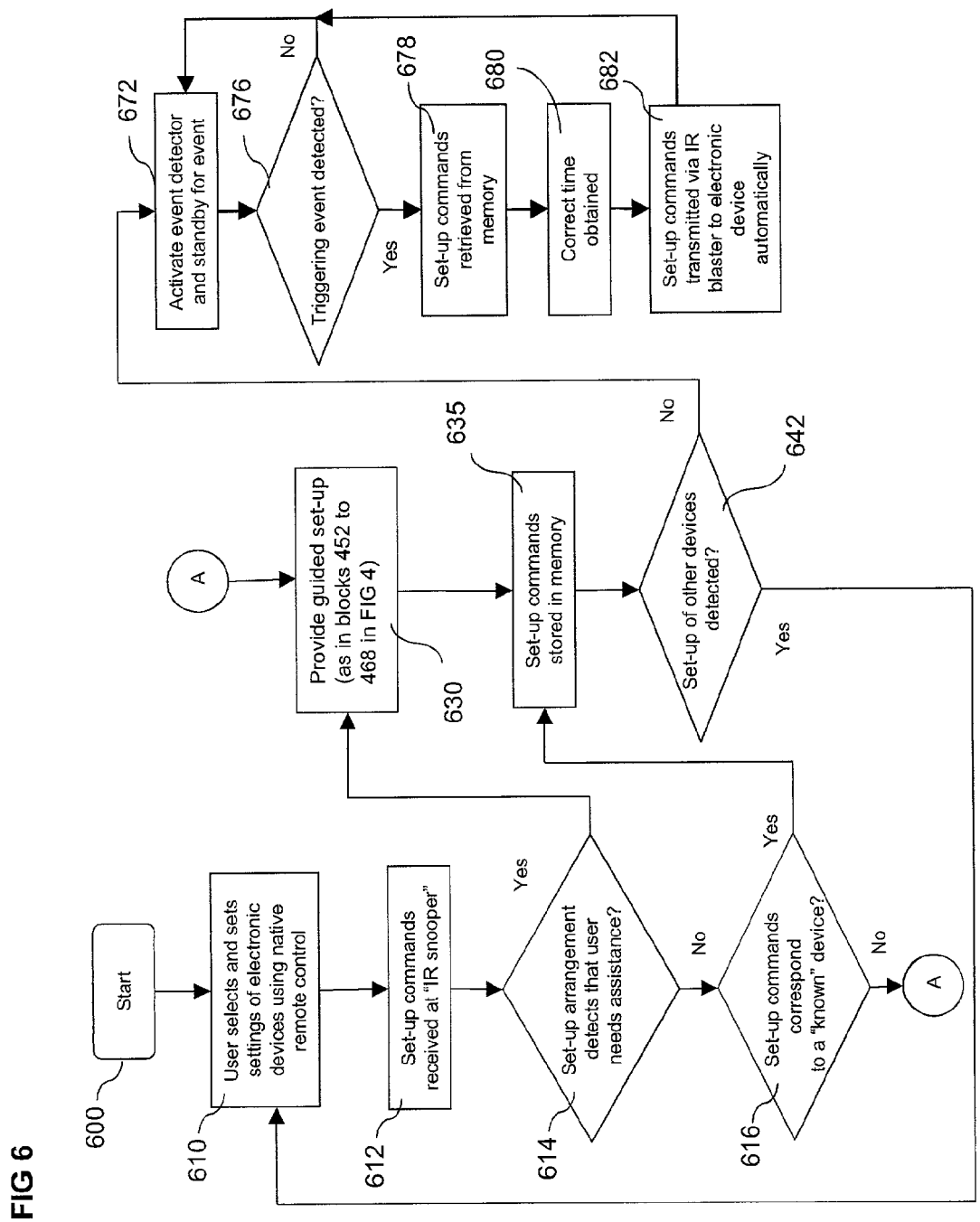
FIG. 6 is a flowchart depicting an illustrative method of operating an automatic set-up device where guided set-up is provided when it is detected that the user needs assistance, or an unknown electronic device is detected.

FIG. 6 is a block diagram of another illustrative method using the IR snooper (i.e., IR receiver 262). In this method, the guided set-up aspect of the invention shown in FIG. 4 and described in the accompanying text, is implemented to facilitate the configuration of new electronic devices, for example, or whenever the inventive arrangement detects that the user may need assistance in configuring electronic equipment.

The method starts at block 600. At block 610, as shown in FIG. 6, the user selects and sets-up the desired settings of features and functions using a native remote control in a conventional manner. At block 612, the IR snooper (e.g., IR receiver 262) receives the set-up commands from the native remote control that are coded in an IR beam.

The automatic set-up device 100 reviews the received set-up commands to determine whether the user is having difficulty or requires assistance (for example, the received command sequence does not correspond to a known command sequence, the received key presses are inconsistent with each other, or the received key presses otherwise indicate that the user requires assistance), as shown in decision block 614. If the received set-up commands indicate to the automatic set-up device 100 that assistance is required, then control passes to block 630 as the guided set-up arrangement shown above in FIG. 4 and described in the text accompanying blocks 452 to 468.

At block 635, as shown in FIG. 6, the received commands are stored locally in memory 245, uploaded to database 142, or a combination of local and remote storage may be used. If no assistance opportunity is detected at decision block 614, then control passes to decision block 616. Here, the set-up commands received by the IR snooper are compared against the stored set-up commands to determine if the received commands correspond to an electronic device that has been previously configured or set-up by the user using the inventive arrangement (i.e., the device is previously "known" to the automatic set-up device 100). If the electronic device is not known, then control passes to block 630 and the automatic set-up device 100 prompts to user through a guided set-up, as depicted in block 630.

Advantageously then, the user is afforded with an automatic set-up opportunity whenever electronic equipment is newly acquired. The user merely needs to activate the native remote control to indicate that new equipment is present and the automatic set-up device 100 then guides the user through a step-by-step installation and set-up procedure without requiring the user to consult the often complex documentation accompanying the electronic device.

At decision block 642, if other electronic device set-ups are detected, then the process described with blocks 610 to 616 repeats, and set-up commands for the other electronic device are also stored in memory at block 635. The method continues at blocks 672 to 682 where, upon the detection of a triggering event, set-up commands are automatically broadcast via an IR beam to the electronic devices to restore settings, in accordance with the invention.

Figure 7:
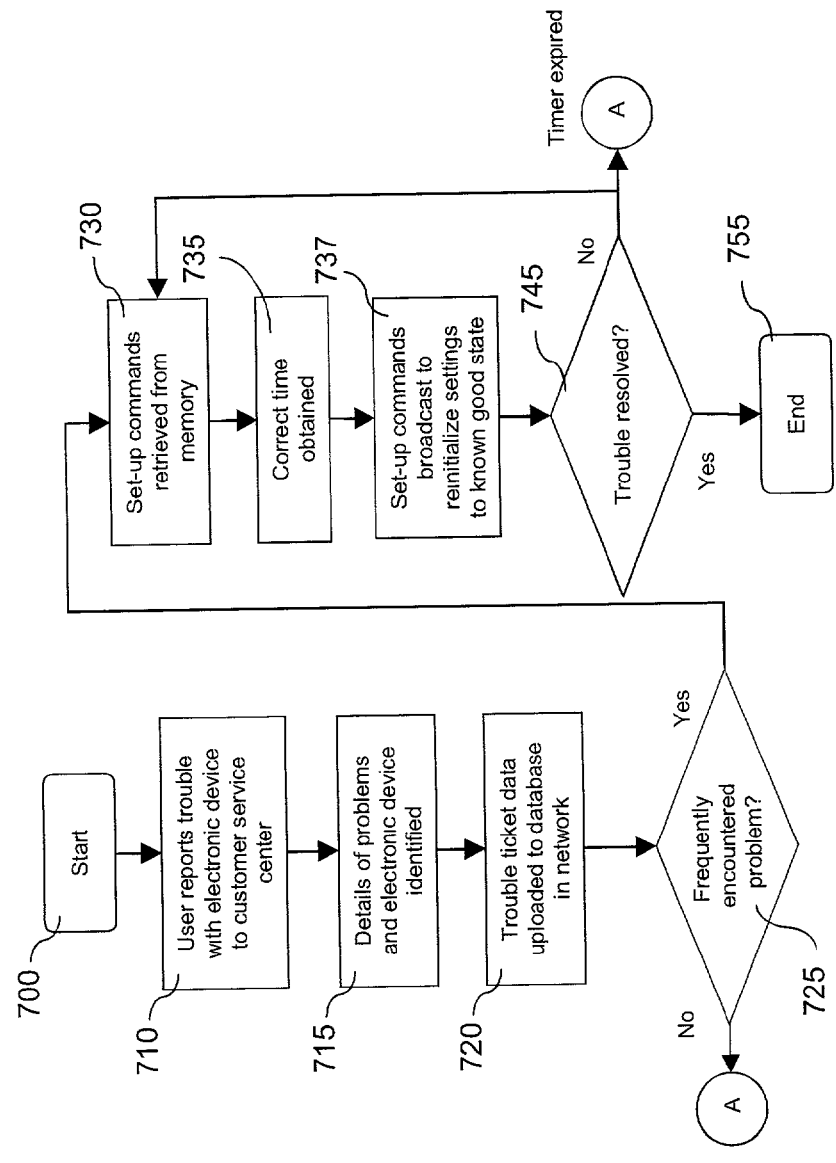
FIG. 7 is a flowchart depicting an illustrative method for performing remote diagnosis and troubleshooting of electronic devices, in accordance with the invention.

Referring now to FIG. 7, there is shown a block diagram of an illustrated method for performing remote diagnosis and troubleshooting of electronic device 107 (FIG. 1). In the illustrative method depicted in FIG. 7, the trouble reporting and corresponding remote diagnosis and troubleshooting is performed in an automated manner, without the intervention of a CSR or other person, except for difficult or unusual circumstances that may not be readily resolved in such an automated manner.

The method starts at block 700. At block 710, the user reports difficulty with one or more electronic devices 107 to the customer service center 129 (FIG. 1). Such reporting may be performed by interacting with an appropriate GUI and menu provided by the automated set-up device 100. Thus, by entering the appropriate information with the remote control 110 (or selecting the appropriate trouble descriptions from a menu), the user may identify the affected electronic device and note the associated trouble in some detail, as shown by block 715. The problem is electronically documented as a trouble ticket that is uploaded to headend 135 (FIG. 1), as shown in block 720. Other methods for communicating with a CSR may also be used, for example by placing a telephone call over PSTN 125 (FIG. 1) or by accessing the service provider's website via the internet.

If, as depicted in decision block 725, the trouble is one that is frequently encountered, an automated response as provided by blocks 730 to 737 may be appropriately used. For example, certain conflicts between specific models of devices may be known to cause particular problems. In such cases, a resolution of the problem may be implemented by retrieving the appropriate set-up commands and broadcasting them to the affected electronic devices. Such commands may reset the electronic devices to an initialized state, or otherwise program the devices to avoid the conflict, if possible. If a time setting needs to be performed, then the correct time is obtained, as indicated in block 735.

Figure 8:
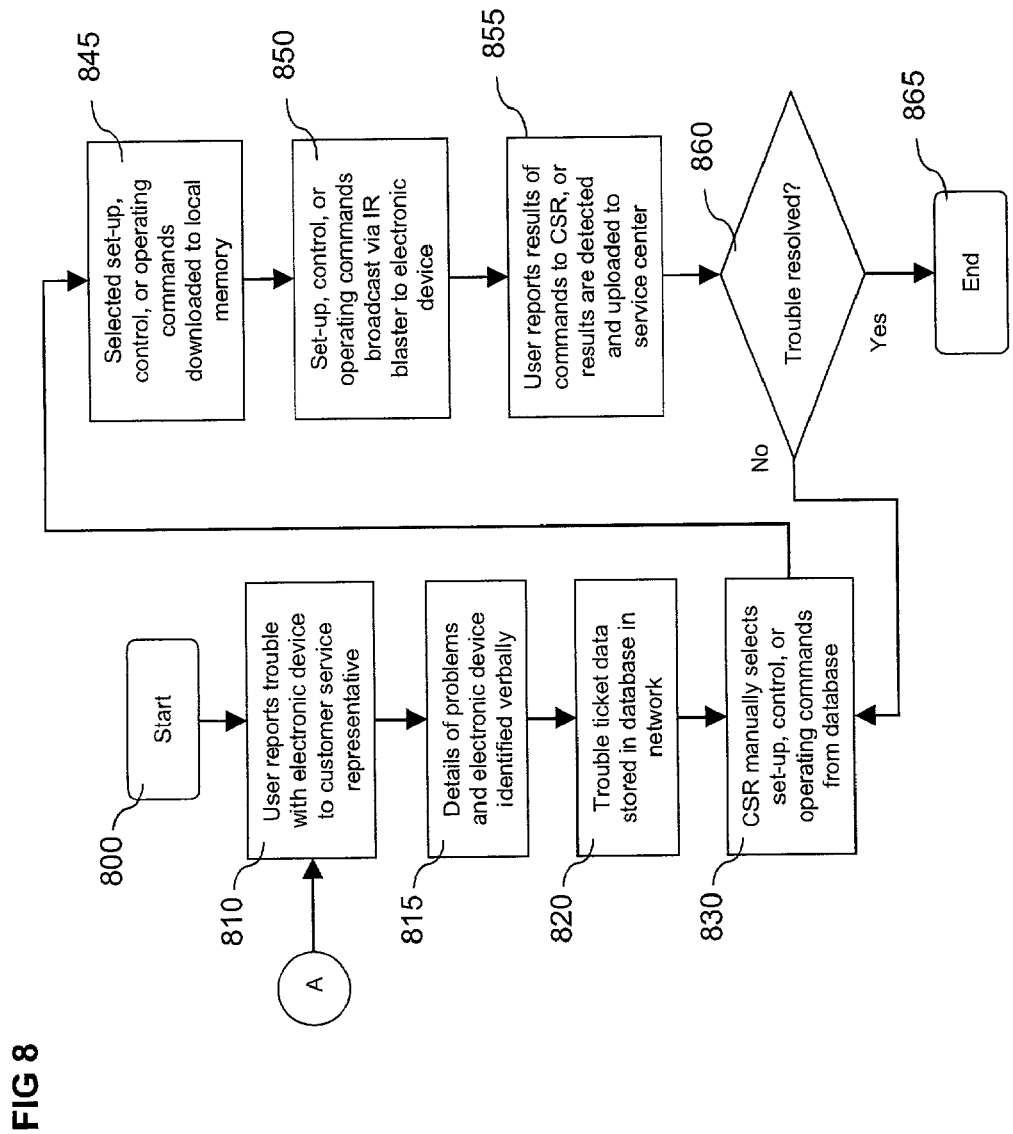
FIG. 8 is a flowchart depicting another illustrative method for performing remote diagnosis and troubleshooting of electronic devices, in accordance with the invention.

If a determination is made that the reported trouble is not common, or the problem requires some special handling that is best provided by a CSR, then control passes to control point "A" and the functional blocks included in FIG. 8. Such human intervention may be optionally invoked by the user, for example, by selecting an appropriate menu option, by placing a telephone call directly to the customer service center or by accessing the service provider's website.

If the selected set-up command resolves the problem, then the method ends at block 755, otherwise, the process depicted in blocks 730 to 737 repeats, with another set-up command being tried, until either the problem is resolved, or a predetermined troubleshooting time period expires. In the case of time expiration, control passes to control point "A" and the functional blocks included in FIG. 8.

FIG. 8 is a flowchart depicting another illustrative method for performing remote diagnosis and troubleshooting of electronic devices 107. In the illustrative method depicted in FIG. 8, the trouble reporting and corresponding remote diagnosis and trouble shooting are performed in a semi-automated manner with the assistance of a human CSR or other person. The method depicted in FIG. 8 may be invoked by the user as a primary method of trouble resolution, or may be a back-up to the automated method depicted in FIG. 8 and described in the accompanying text.

The method starts at block 800. At block 810, the user reports the trouble to a CSR, using example, a telephone call placed on PSTN 125 (FIG. 1). Block 810 is also the entry point to the method from control points "A" in FIG. 7. Moving to block 815, a verbal description of the problems is provided and the affected electronic devices are identified. Trouble ticketing data may be stored in database 142 (FIG. 1) for recording keeping purposes, or to assist with future trouble resolution sessions, as indicated in block 820.

Block 830 indicates that the CSR may manually select a set-up, control, or operating command, or a command sequence, from database 142 or from other sources of documentation pertaining to the affected electronic devices. At block 845, the commands are downloaded to memory 245 contained in automatic set-up device 100. At block 850, the IR blaster 255 broadcasts the commands via an IR beam to the electronic devices 107.

The user reports the results of the commands selected by the CSR as indicated by block 855. If, at decision block 860 the trouble is resolved, the method ends at block 865, otherwise the CSR may try additional commands and ascertain the results after the additional commands are broadcast until the trouble is resolved. In some applications of the invention, the results of the commands may be detected by a device and reported directly to the CSR through a network connection. For example, a set-top terminal having a connection via a bilateral communication network (such as cable plant 132 in FIG. 1) or telephone network (such as PSTN 125 in FIG. 1), may be arranged to perform self diagnosis and upload the diagnosis results to the headend 135 (FIG. 1).

Figure 9:
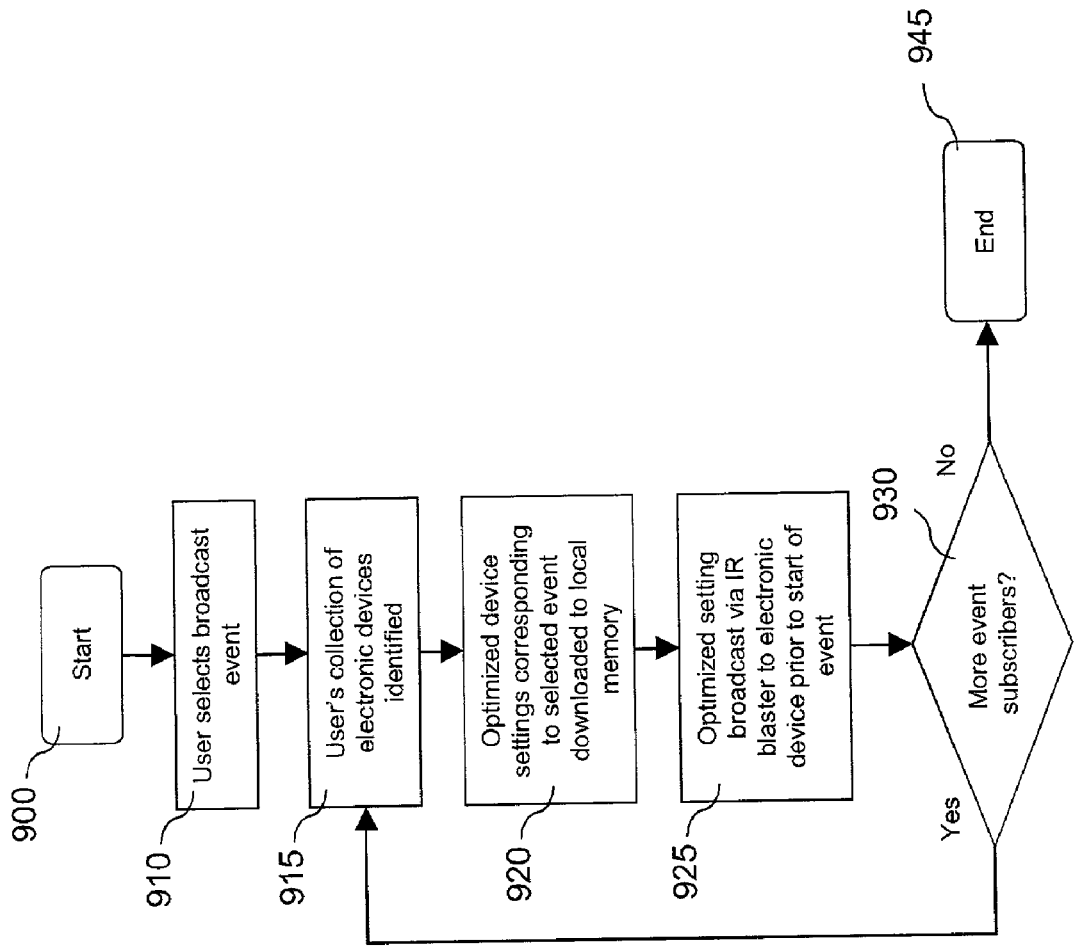
FIG. 9 is a flowchart depicting an illustrative method for sharing common or similar set-up arrangements, in accordance with the invention.

FIG. 9 is a flowchart depicting an illustrative method for sharing common or similar set-ups among a group of users. Such sharing may be desired, for example, when a common media event such as a broadcast concert or movie has associated home entertainment system settings that may be optimized to the event. In the movie scenario, sound effects may be presented with greatest dramatic impact, for example, if the receiver is set to decode the audio soundtrack using a particular method or protocol, or the audio equalization is set to a recommended configuration. Similarly, the video component may have optimal or recommended settings including screen aspect ratio and resolution.

The method starts at block 900. At block 910, a user selects a broadcast event, for example, by subscribing to a typical "pay-per-view" event. At block 915, the user's collection of electronic devices 107 is identified. Such identification may be made, in some instances, by retrieving a user profile that has been previously stored, either locally in memory 245 (FIG. 2) or at database 142 (FIG. 1).

Optimized electronic device settings corresponding to the selected event and identified electronic devices are selected and downloaded to memory 245 in automatic set-up device 100, as shown in block 920. At block 925, the optimized settings are broadcast as a command or command sequence to the appropriate electronic devices 107 prior to the start of the event.

The method shown in blocks 910 to 925 is repeated until all the event subscribers have received the optimized settings for the event. Once that occurs, the method ends at block 945, as shown in FIG. 9.

Other embodiments of the invention may be implemented in accordance with the claims that follow.

What is claimed is:

1. A method of controlling settings in an electronic device, the electronic device having user-controllable functionalities, the method comprising the steps of:
   providing a menu to a user with which at least one of the controllable functionalities may be set by a user;
   receiving a user-selected menu choice indicative of a selected setting of the at least one controllable functionality, wherein the selected setting are stored in a memory;
   receiving from a database, a set-up command corresponding to the menu choice; and
   transmitting the set-up command in an IR beam to the electronic device to set the user-controllable functionality of the electronic device to the selected setting, wherein the transmitting step is performed subsequent to receiving an indication of a power loss, wherein the indication of power loss is automatically generated and does not require user intervention;
   wherein the set-up command corresponding to the stored selected settings are transmitted automatically, immediately upon detection of power restoration after a power outage.

2. A method of configuring an electronic device, the electronic device being controllable by a native remote control, the method comprising the steps of:
   receiving an IR signal, at an automatic set-up device, indicative of a user-controlled command that is transmitted between the native remote control and the electronic device;
   sending the command to a memory, wherein said memory is remote from the native remote control;
   detecting a triggering event;
   retrieving, in response to the detected triggering event, the command from the memory; and
   transmitting the command in an IR beam to the electronic device,
   wherein the step of transmitting is performed in response to the detected triggering event, and wherein the triggering event is automatically detected at the automatic set-up device and is not based on user interaction.

3. The method of claim 2 wherein the event comprises restoration of power following a power outage.

4. The method of claim 2 wherein the event comprises a seasonal time change.

5. The method of claim 2 wherein the command is automatically transmitted upon detecting the triggering event to restore configuration settings of the electronic device.

6. An apparatus for configuring an electronic device, the electronic device being controllable by a native remote control, comprising:
- an IR receiver for receiving an IR signal, indicative of a user-controlled command, that is transmitted between the native remote control and the electronic device;
- an interface to a memory, the memory arranged to store the command, wherein said memory is remote from the native remote control;
- a detector for detecting a triggering event, wherein the triggering event is automatically detected by the detector at the electronic device and is not based on user interaction;
- a processor operably coupled to the memory for retrieving the command when the triggering event is detected; and
- an IR transmitter for transmitting the command in an IR beam to the electronic device.

7. The apparatus of claim 6 wherein the memory is located locally with the processor.

8. The apparatus of claim 6 wherein the memory is located at a controller at a remote headend.

9. The apparatus of claim 6 wherein the event comprises restoration of power following a power outage.

10. The apparatus of claim 6 wherein the event comprises a seasonal time change.

11. The apparatus of claim 6 further including a set-top terminal module.

12. The apparatus of claim 6 wherein the apparatus for configuring an electronic device is incorporated substantially within a set-top terminal.

13. A method for configuring an electronic device, the electronic device being controllable by a native remote control, the method comprising the steps of:
- receiving an IR signal from the native remote control;
- sending an electronic representation of the received signal to a processor to identify the electronic device, the processor comparing the representation to a library of stored characteristics where each stored characteristic has an associated identified electronic device;
- retrieving a configuration command matched to the identified electronic device from a memory, wherein the memory is remote from the native remote control; and
- automatically transmitting the retrieved configuration command in an IR beam to the electronic device,
- wherein the step of transmitting is performed in response to an event that (a) is automatically detected, and (b) occurs without user intervention.

14. The method of claim 13 wherein the event comprises restoration of power following a power outage.

15. The method of claim 13 wherein the event is a seasonal time change.

16. The method of claim 13 wherein the configuration commands are transmitted automatically upon detection of power restoration after a power outage.

17. An apparatus for configuring an electronic device, the electronic device being controllable by a native remote control, the apparatus comprising:
- a receiver for receiving an IR signal from the native remote control;
- an interface operably coupled to a comparator through which a representation of the received signal is sent to the comparator to identify the electronic device by comparing the representation to a library of stored characteristics, where each stored characteristic has an associated identified electronic device;
- a processor for retrieving a configuration command pertaining to the identified electronic device from a memory wherein the memory is remote from the native remote control;
- an IR transmitter for transmitting the retrieved command in an IR beam to the electronic device; and
- an event detector for automatically triggering the IR transmitter upon detection of an event, wherein the event is automatically detected by said event detector and is not based on user interaction.

18. The apparatus of claim 17 wherein the event comprises restoration of power following a power outage.

19. The apparatus of claim 17 wherein the event comprises a seasonal time change.

20. The apparatus of claim 17 further including a controller for triggering the IR transmitter automatically upon restoration of power subsequent to a power outage.

21. The apparatus of claim 17 further including a set-top terminal module.

22. The apparatus of claim 17 wherein the apparatus for controlling settings is incorporated substantially within a set-top terminal.

23. A method for restoring configuring settings in an electronic device after a power loss, the electronic device being controllable by a native remote control, the method comprising the steps of:
- receiving a set of IR signals from the native remote control, the set of IR signals indicative of a user-defined command;
- interpreting the received IR signal set to identify the electronic device by comparing the representation to a library of stored characteristics, each stored characteristic having an associated identified electronic device;
- detecting a power loss, wherein said detecting does not require user intervention;
- retrieving a configuration command pertaining to the identified electronic device from a memory subsequent to an occurrence of the power loss; and
- transmitting the retrieved configuration command in an IR beam to the electronic device to restore the configuration settings to an original state.

24. The method of claim 23 wherein the step of transmitting is performed in response to a detected event.

25. The method of claim 23 wherein the event comprises restoration of power following a power outage.

26. The method of claim 23 wherein the event is a seasonal time change.

* * * * *